United States Patent
Sun et al.

(10) Patent No.: US 11,640,527 B2
(45) Date of Patent: May 2, 2023

(54) NEAR-ZERO-COST DIFFERENTIALLY PRIVATE DEEP LEARNING WITH TEACHER ENSEMBLES

(71) Applicant: salesforce.com, inc., San Francisco, CA (US)

(72) Inventors: Lichao Sun, Chicago, IL (US); Jia Li, Mountain View, CA (US); Caiming Xiong, Menlo Park, CA (US); Yingbo Zhou, San Jose, CA (US)

(73) Assignee: Salesforce.com, Inc., San Francisco, CA (US)

( * ) Notice: Subject to any disclaimer, the term of this patent is extended or adjusted under 35 U.S.C. 154(b) by 709 days.

(21) Appl. No.: 16/658,399

(22) Filed: Oct. 21, 2019

(65) Prior Publication Data
US 2021/0089882 A1   Mar. 25, 2021

Related U.S. Application Data

(60) Provisional application No. 62/906,020, filed on Sep. 25, 2019.

(51) Int. Cl.
*G06N 3/08* (2006.01)
*G06N 3/04* (2006.01)
*G06N 3/082* (2023.01)

(52) U.S. Cl.
CPC .............. *G06N 3/08* (2013.01); *G06N 3/04* (2013.01); *G06N 3/0454* (2013.01); *G06N 3/082* (2013.01); *G06T 2207/00* (2013.01); *G06T 2207/20081* (2013.01); *G06T 2207/20084* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 10,282,663 B2 | 5/2019 | Socher et al. | |
| 10,282,914 B1 * | 5/2019 | Tran | G06Q 30/0643 |
| 10,346,721 B2 | 7/2019 | Mbright et al. | |
| 2013/0262465 A1 * | 10/2013 | Galle | G06F 16/00 707/E17.089 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |

(Continued)

OTHER PUBLICATIONS

Nicolas Papernot, Martin Abadi, Ulfar Erlingsson, Ian Goodfellow, Kunal Talwar, Semi-Supervised Knowledge Transfer for Deep Learning From Private Training Data, Mar. 3, 2017, Published as a conference paper at ICLR 2017 (Year: 2017).*

(Continued)

*Primary Examiner* — Kevin Ky
(74) *Attorney, Agent, or Firm* — Haynes and Boone LLP

(57) ABSTRACT

Systems and methods are provided for near-zero-cost (NZC) query framework or approach for differentially private deep learning. To protect the privacy of training data during learning, the near-zero-cost query framework transfers knowledge from an ensemble of teacher models trained on partitions of the data to a student model. Privacy guarantees may be understood intuitively and expressed rigorously in terms of differential privacy. Other features are also provided.

18 Claims, 4 Drawing Sheets

(56) References Cited

U.S. PATENT DOCUMENTS

| | | |
|---|---|---|
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Kiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0205748 A1* | 7/2019 | Fukuda ............... G06N 3/0454 |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Asl et al. |
| 2019/0295530 A1 | 9/2019 | Asl et al. |
| 2019/0311002 A1 | 10/2019 | Paulus |
| 2020/0034703 A1* | 1/2020 | Fukuda ................ G06N 3/08 |
| 2020/0066029 A1* | 2/2020 | Chen ..................... G06T 15/04 |
| 2020/0302019 A1* | 9/2020 | Hall ...................... G10L 15/22 |
| 2020/0334538 A1* | 10/2020 | Meng ................. G06N 3/0454 |
| 2020/0365143 A1* | 11/2020 | Ogawa ............... G06N 3/0445 |
| 2021/0015292 A1* | 1/2021 | An ........................ G01G 19/00 |
| 2021/0035564 A1* | 2/2021 | Ogawa ............... G06N 3/0454 |
| 2021/0089882 A1* | 3/2021 | Sun ........................ G06N 3/08 |
| 2021/0192360 A1* | 6/2021 | Bitauld ................. H04L 63/04 |
| 2022/0180199 A1* | 6/2022 | Xu ...................... G06N 3/0454 |

OTHER PUBLICATIONS

Abadi et al., "Deep Learning with Differential Privacy," In Proceedings o f the 2016 ACM SIGSAC Conference on Computer and Communications Security, CCS '16, 2016, pp. 1-14.

Agarwal et al., "cpsgd: Communication-efficient and Differentially-Private Distributed SGD," 32nd Conference on Neural Information Processing Systems (NIPS 2018), Montréal, Canada, pp. 1-12.

Babak et al., "Predicting the Sequence Specificities of DNA- and RNA-Binding Proteins by Deep Learning," Nature biotechnology, 33(8):831-839, 2015.

Andres et al., Geo-Indistinguishability: Differential Privacy for Location-Based Systems, In Proceedings of the 2013 ACM SJGSAC Conference on Computer &#/38; communications security, CCS '13, pp. 901-914, New York, NY, USA, 2013, ACM.

Bassily et al., "Differentially Private Empirical Risk Minimization: Efficient Algorithms and Tight Error Bounds," arXiv preprint arXiv:1405.7085, 2014, pp. 1-39.

Beimel et al., "Bounds on the Sample Complexity for Private Learning and Private Data Release," Machine Learning, 94(3):401-437, 2014.

Chaudhuri et al., "Differentially Private Empirical Risk Minimization," Journal of Machine Learning Research, 12(Mar):1069-1109, 2011.

Devlin et al., "BERT: Pre-training of Deep Bidirectional Transformers for Language Understanding," 2018 O'Reilly Artificial Intelligence Conference, pp. 1-14.

Duchi et al., Local Privacy and Statistical Minimax Rates. In Proc. of IEEE Foundations of Computer Science (FOCS), 2013, pp. 1-10.

Dwork et al., "The Algorithmic Foundations of Differential Privacy," Foundations and Trends in Theoretical Computer Science, 2014, 9:211-407.

Dwork et al., "Calibrating Noise to Sensitivity in Private Data Analysis," In Shai Halevi and Tai Rabin, editors, Theory of Cryptography, Berlin, Heidelberg. 2006. Springer Berlin Heidelberg, pp. 265-284.

Dwork et al., "Boosting and Differential Privacy," in 2010 IEEE 51st Annual Symposium on Foundations of Computer Science, IEEE, 2010, pp. 51-60.

Dwork, "Differential Privacy," Encyclopedia of Cryptography and Security, 2011, pp. 338-340.

Dwork, "A Firm Foundation for Private Data Analysis," Communications of the ACM, 54(1):86-95, 2011.

Friedman et al., "Data Mining with Differential Privacy," In Proceedings of the 16th ACM SIGKDD International Conference on Knowledge Discovery and Data Mining, ACM, 2010, pp. 493-502.

Gong et al., "Deepscan: Exploiting Deep Learning for Malicious Account Detection in Location-Based Social Networks," IEEE Communications Magazine, 2018, pp. 1-8.

Hamm et al., "Learning Privately from Multiparty Data," Proceedings of the 33rd International Conference on Machine Learning, New York, NY, USA, 2016, JMLR: W&CP vol. 48, Copyright 2016 pp. 555-563.

He et al., "Deep residual learning for image recognition," In Proceedings of the IEEE Conference on Computer Vision and Pattern Recognition, Las Vegas, NV, USA. Jun. 26-Jul. 1, 2016. pp. 770-778.

Jordon et al., "Pate-gan: Generating Synthetic Data with Differential Privacy Guarantees," Published as a Conference Paper at ICLR 2019, pp. 1-21.

Lecun et al., "Gradient-Based Learning Applied to Document Recognition," Proceedings of the IEEE, 1998, vol. 86(11), pp. 1-46.

Ma et al., "Pdlm: Privacy-Preserving Deep Learning Model on Cloud with Multiple Keys," IEEE Transactions on Services Computing, 2018, pp. 1-13.

McMahan et al., Learning Differentially Private Recurrent Language Models without Losing Accuracy, arXiv preprint arXiv: 1710.06963, 2017, pp. 1-15.

Michie et al., "Machine Learning," Neural and Statistical Classification, 1994, pp. 1-298.

Netzer et al., "Reading Digits in Natural Images with Unsupervised Feature Learning," Proceedings of the 24th International Conference on Neural Information Processing Systems, 2011, pp. 1-9.

Papernot et al., "Semi-Supervised Knowledge Transfer for Deep Learning from Private Training Data," In 5th International Conference on Learning Representations (ICLR), 2017, pp. 1-16.

Papernot et al., "Scalable Private Learning Pate," In 6th International Conference on Learning Representations, ICLR '18, 2018.

Pathak et al., "Multiparty Differential Privacy via Aggregation of Locally Trained Classifiers," In Advances in Neural Information Processing Systems, 2010, pp. 1-10.

Nissim et al., "Smooth Sensitivity and Sampling in Private Data Analysis," In Proceedings of the Thirty-Ninth Annual ACM Symposium on Theory of Computing, ACM, 2007, pp. 75-84.

Samangouei et al., "Defense-gan: Protecting Classifiers against Adversarial Attacks using Generative Models," Published as a Conference Paper at ICLR 2018, arXiv preprint arXiv: 1805.06605, 2018, pp. 1-17.

Silver et al., "Mastering the Game of Go Without Human Knowledge," Nature, 2017, 550: 354-359, pp. 1-18.

Song et al., "Stochastic Gradient Descent with Differentially Provate Updates," In 2013 IEEE Global Conference on Signal and Information Processing, pp. 245-248, IEEE, 2013.

(56) References Cited

OTHER PUBLICATIONS

Apple Differential Privacy Team, Learning with Privacy at Scale, 2017, pp. 1-25.
Yan, Mobile Phone Behavior, Cambridge University Press, 2017.

* cited by examiner

| Dataset | Aggregator | Queries answered | Privacy bound $\varepsilon$ | Accuracy | | |
|---|---|---|---|---|---|---|
| | | | | Student | Clean Votes | Ground Truth |
| MNIST | LNMax ($\gamma$=20) | 100 | 2.04 | 63.5% | 94.5% | 98.1% |
| | LNMax ($\gamma$=20) | 1,000 | 8.03 | 89.8% | | |
| | LNMax ($\gamma$=20) | 5,000 | > 8.03 | 94.1% | | |
| | LNMax ($\gamma$=20) | 9,000 | > 8.03 | 93.4% | | |
| | NZC ($c = 1e^{-300}, \gamma = 1e^{30}$) | 9,000 | ≈ 0 | 95.1% | | |
| | NZC (5 teachers only) | 9,000 | ≈ 0 | 97.8% | 97.5% | |
| SVHN | LNMax ($\gamma$=20) | 500 | 5.04 | 54.0% | 85.8% | 89.3% |
| | LNMax ($\gamma$=20) | 1,000 | 8.19 | 64.0% | | |
| | LNMax ($\gamma$=20) | 5,000 | > 8.19 | 79.5% | | |
| | LNMax ($\gamma$=20) | 10,000 | > 8.19 | 84.6% | | |
| | NZC ($c = 1e^{-300}, \gamma = 1e^{30}$) | 10,000 | ≈ 0 | 85.7% | | |
| | NZC (5 teachers only) | 10,000 | ≈ 0 | 87.1% | 87.1% | |

FIG. 4A

| MNIST | | | | SVHN | | |
|---|---|---|---|---|---|---|
| LNMax | NZC | Clean | | LNMax | NZC | Clean |
| 93.02% | 94.33% | 94.37% | | 87.11% | 88.08% | 88.06% |

FIG. 4B

NEAR-ZERO-COST DIFFERENTIALLY PRIVATE DEEP LEARNING WITH TEACHER ENSEMBLES

RELATED APPLICATION

The present application claims priority to U.S. Provisional Patent Application Ser. No. 62/906,020 filed on Sep. 25, 2019 and entitled "Near Zero-Cost Differentially Private Deep Learning with Teacher Ensembles" which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to near-zero-cost differentially private deep learning with teacher ensembles.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Artificial intelligence, implemented with neural networks and deep learning models, has demonstrated great promise as a technique for automatically analyzing real-world information with human-like accuracy. In general, such neural network and deep learning models receive input information and make predictions based on the same.

Ensuring the privacy of sensitive data used to train modern machine learning models is of paramount importance in many areas of practice. Privacy preserving deep learning is crucial for deploying deep neural network-based solutions, especially when the neural network model is trained with and applied to data that contains sensitive information. However, typically, methods for preserving privacy lead to undesirable degradation in the performance of the model.

BRIEF DESCRIPTION OF THE DRAWINGS

FIGS. 4A and 4B illustrates example results of near-zero-cost differentially private deep learning with teacher ensembles compared to other approaches, according to some embodiments.

Figure 1:
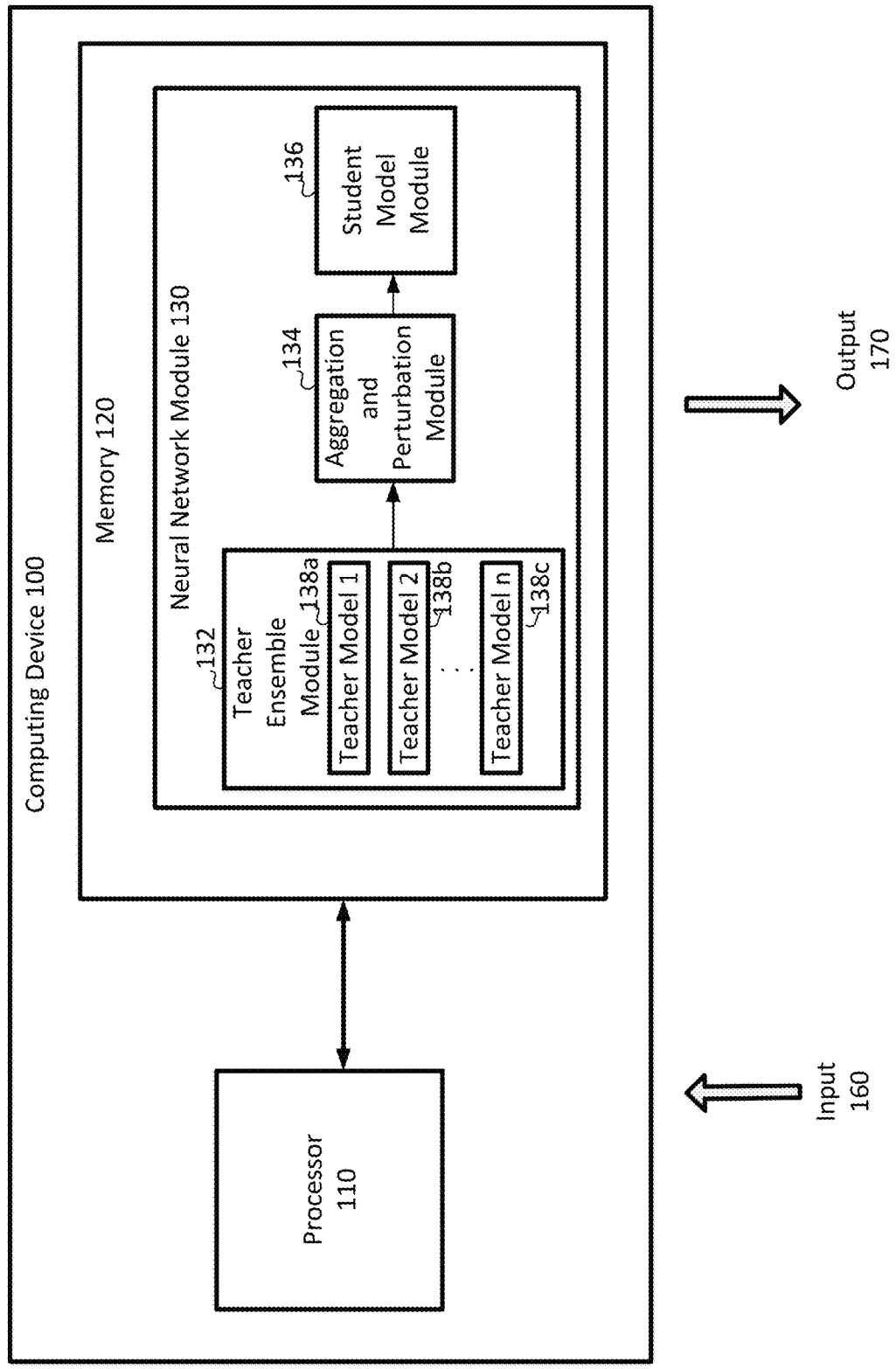
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Artificial intelligence, implemented with neural networks and deep learning models, has demonstrated great promise as a technique for automatically analyzing real-world information with human-like accuracy. In general, such neural network and deep learning models receive input information and make predictions based on the input information.

Deep learning models have been used in a variety of domains or application, such as image classification, natural language processing, reinforcement learning, etc. A number of these applications involve training models using highly sensitive data, such as, for example, diagnosis of diseases with medical records or genetic sequences, mobile commerce behavior prediction, and location-based social network activity recognition. However, recent studies exploiting privacy leakage from deep learning models have demonstrated that private, sensitive training data can be recovered from released models.

In order to protect the privacy of the training data and mitigate the effects of potential adversarial attacks, various approaches to privacy protection have been proposed. One such approach is through differential privacy, an example of which is a "teacher-student" framework. In a teacher-student framework, knowledge or data (some of which may be private or sensitive) is transferred from a teacher model to help train a student model to achieve similar performance with the teacher. To address the privacy-preserving need, knowledge from the teacher model is perturbed with random noise, before being passed to the student model. In this way, it is hoped that an adversary cannot ascertain the contributions of specific individuals in the original dataset even if the adversary has full access to the student model. Using the techniques of differential privacy, such protection can be provided or enhanced in certain settings. However, the current teacher-student frameworks involve a trade-off between privacy and the student's performance. This is because the amount of noise perturbation required is substantial to ensure privacy at the desired level, which leads to degraded information passed to student that results in inaccurate models.

To address such challenges or problems, according to some embodiments, the present disclosure provides systems and methods that facilitate the deployment of accurate deep learning models with near zero privacy cost. In some embodiments, zero-cost differentially private deep learning is provided using an ensemble of teacher models, where the teacher ensemble returns information to a student model based on a noisy voting procedure. In some embodiments, a voting mechanism, which may be referred to as Immutable Noisy ArgMax, is provided that, under certain conditions, can bear very large random noising from the teacher models without infecting the useful information transferred to the student model. In particular, the mechanism aggregates the answers of the teacher models and is more immutable against larger noise without changing the consensus of the teachers. The systems and methods disclosed herein improve over the state-of-the-art approaches, and scale to larger tasks with both higher utility and stronger privacy.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. Neural network module 130 may be used, in some examples, for image classification, language processing, reinforcement learning, or other tasks and applications. Neural network module 130 may also handle the iterative training and/or evaluation of a system or model using sensitive data, such as, for example, diagnosis of diseases with medical records or genetic sequences, mobile commerce behavior prediction, and location-based social network activity recognition. In some examples, memory 120 may include non-transitory, tangible, machine readable media that includes executable code that when run by one or more processors (e.g., processor 110) may cause the one or more processors to perform the methods described in further detail herein. In some examples, neural network module 130 may be implemented using hardware, software, and/or a combination of hardware and software. As shown, computing device 100 receives input 160, which is provided to neural network module 130, neural network module 130 then generates output 170.

According to some embodiments, computing device 100 implements a near-zero-cost (NZC) query framework or approach to protect the privacy of training data during learning. In some embodiments, for this framework, the neural network module 130 includes a teacher ensemble module 132, an aggregation and perturbation module 134, and a student model module 136. The teacher ensemble module 132 implements an ensemble of n teacher models 138a, 138b, and 138c. Each teacher model 138a-c may be trained on a respective partition of the data from a training set that may include sensitive or private data. This training set may be received as part of input 140. The near-zero-cost query framework transfers knowledge from the ensemble of teacher models trained on partitions of the data to the student model. Each teacher model 138a-c outputs respective results (e.g., predictions or estimates) based on the training data. The aggregation and perturbation module 134 provides or supports aggregation and noise perturbation on the results from the teacher models 138a-c of the ensemble. The student model module 136 implements a student model that is trained with the output returned by the aggregation and perturbation module 134.

Near-Zero-Cost Differentially Private Deep Learning with Teacher Ensembles

According to some embodiments, systems and methods implement a near-zero-cost (NZC) query framework or approach for differentially private deep learning. To protect the privacy of training data during learning, the near-zero-cost query framework transfers knowledge from an ensemble of teacher models trained on partitions of the data to a student model. Privacy guarantees may be understood intuitively and expressed rigorously in terms of differential privacy.

Differential Privacy

To satisfy the increasing demand for preserving privacy, differential privacy (DP) has been proposed as a rigorous principle that provides or enhances provable privacy protection.

Let $f$ be a deterministic function that maps the dataset D to the real numbers $\mathbb{R}$. This deterministic function $f$, under the context of differential privacy, is called a query function of the dataset D. The query function may request the mean of a feature in the dataset, for example, the gender of each sample or entry. The goal in privacy is to ensure that when the query function is applied on a different but close dataset D', the outputs of the query function are indistinguishable compared to that from the dataset D such that the private information of individual entries in the dataset cannot be inferred by malicious attacks. Here, two datasets D and D' are regarded as adjacent datasets when they are identical except for one single item.

Informally speaking, a randomized data release mechanism for a query function $f$ is said to ensure differential privacy if "neighboring" inputs induce similar distributions over the possible outputs of the mechanism. Differential privacy is particularly useful for quantifying privacy guarantees of queries computed over a database with sensitive entries. The formal definition of differential privacy is given below.

Definition 1.

A randomized mechanism $\mathcal{M}$ is $(\epsilon, \delta)$-differentially private if for any adjacent data D, and D', i.e., $\|D-D'\|_1 \leq 1$, and any output Y of $\mathcal{M}$, we have $$Pr[\mathcal{M}(D)=Y] \leq e^\epsilon \cdot Pr[\mathcal{M}(D')=Y] + \delta. \quad (1)$$

If $\delta=0$, it can be said that $\mathcal{M}$ is $\epsilon$-differentially private. The parameter $\epsilon$ represents the privacy budget that controls the privacy loss of $\mathcal{M}$. A larger value of $\epsilon$ indicates weaker privacy protection.

Definition 2.

A randomized mechanism $\mathcal{M}$ is $(\epsilon, \delta)$-differentially private if for any adjacent data D and D', i.e., $\|D-D'\|_1 \leq 1$, and any output Y of $\mathcal{M}$, we have $$e(o; M, aux, D, D') \triangleq \log \frac{Pr[\mathcal{M}(aux, D) = o]}{Pr[\mathcal{M}(aux, D') = o]}, \quad (2)$$

The privacy loss random variable $C(\mathcal{M}, aux, D, D')$ is defined as $c(\mathcal{M}(d); \mathcal{M}, aux, D, D')$, i.e., the random variable defined by evaluating the privacy loss at an outcome sampled from $\mathcal{M}(D)$.

From the principle of differential privacy, it is known that the sensitivity of the deterministic function $f$ (i.e., a query function) about the dataset is important for designing the mechanism for the query function. For different noise mechanisms, it requires different sensitivity estimation. For example, the $\ell_2$-norm sensitivity $\Delta_2 f$ of the query function $f$ is used for Gaussian mechanism which is defined as $\Delta_2 f = \max_{D,D'} \|f(D)-f(D')\|_2$, where D and D' are two neighboring datasets. For the Laplacian mechanism, it uses the $\ell_1$-norm sensitivity $\Delta f$ for random noise sampling. In essence, when the sensitivity is smaller, then the query function itself is not very distinguishable given different datasets.

A general method for enforcing a query function $f$ with the $(\epsilon, \delta)$-differential privacy is to apply additive noise calibrated to the sensitivity of $f$. A general method for ensuring a deterministic query $f$ to be the $(\epsilon, \delta)$-differential privacy is via perturbation mechanisms that add calibrated noise to the query's output.

Theorem 1.

If the $\ell_1$-norm sensitivity of a deterministic function $f$ is $\Delta f$, we have:

$$\mathcal{M}_f(D) \triangleq f(D) + \text{Lap}\left(\frac{\Delta f}{\epsilon}\right), \quad (3)$$

where $\mathcal{M}_f$ preserves $(\epsilon, 0)$-differential privacy, and Lap(b) is the Laplacian distribution with location 0 and scale b.

Theorem 2.

If the $\ell_2$-norm sensitivity of a deterministic function $f$ is $\Delta_2 f$, we have:

$$\mathcal{M}_f(D) \triangleq f(D) + \mathcal{N}(0, \Delta_2 f^2 \sigma^2), \quad (4)$$

where $\mathcal{N}(0, \Delta_2 f^2 \sigma^2)$ is a random variable obeying the Gaussian distribution with mean 0 and standard deviation $\Delta_2 f \sigma$. The randomized mechanism $\mathcal{M}_f(d)$ is $(\epsilon, \delta)$ differentially private if $\sigma \geq \sqrt{2\ln(1.25/\delta)}/\epsilon$ and $\epsilon < 1$.

Near-Zero-Cost Framework or Approach

Figure 2:
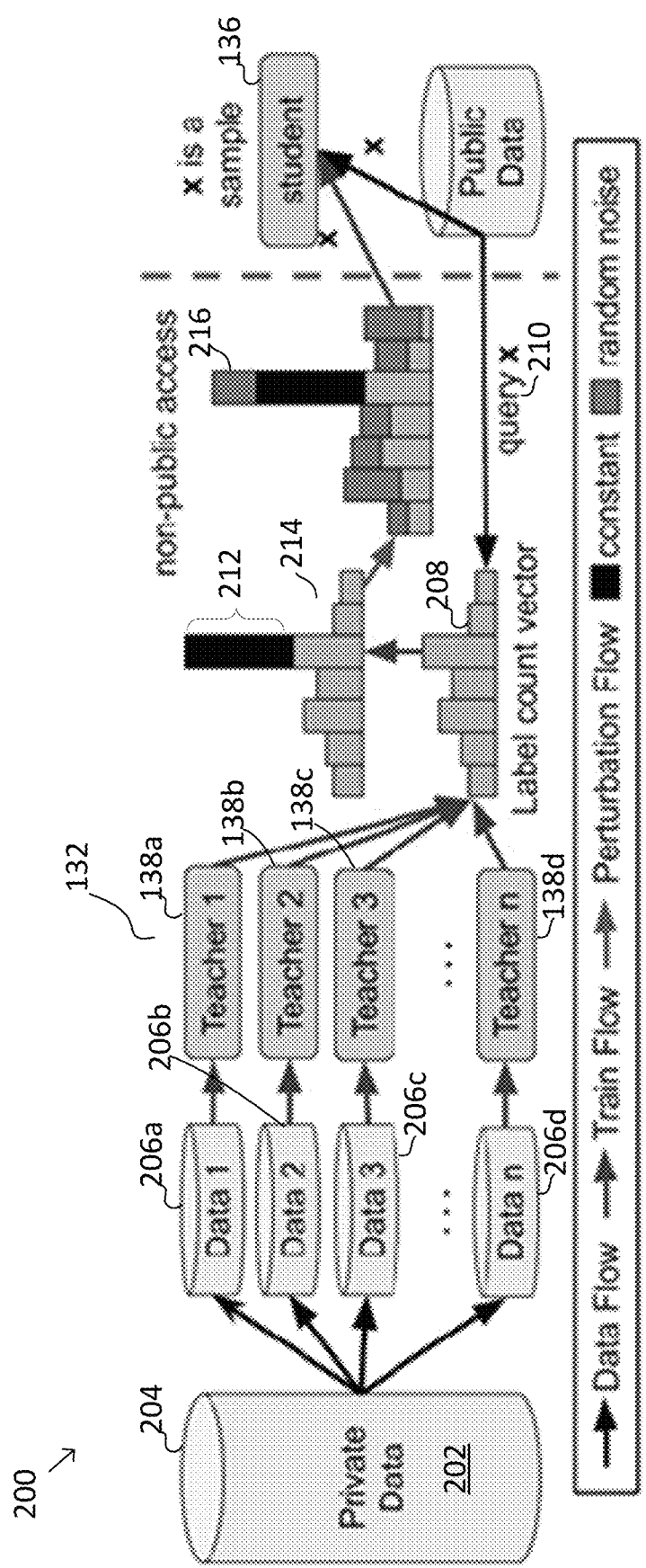
FIG. 2 is a simplified diagram of a framework for near-zero-cost differentially private deep learning with teacher ensembles according to some embodiments.

FIG. 2 is a simplified diagram of the framework 200 for near-zero-cost differentially private deep learning with teacher ensembles according to some embodiments. In some embodiments, aspects of framework 200 can be implemented by neural network module 130 of computing device 100.

Figure 3:
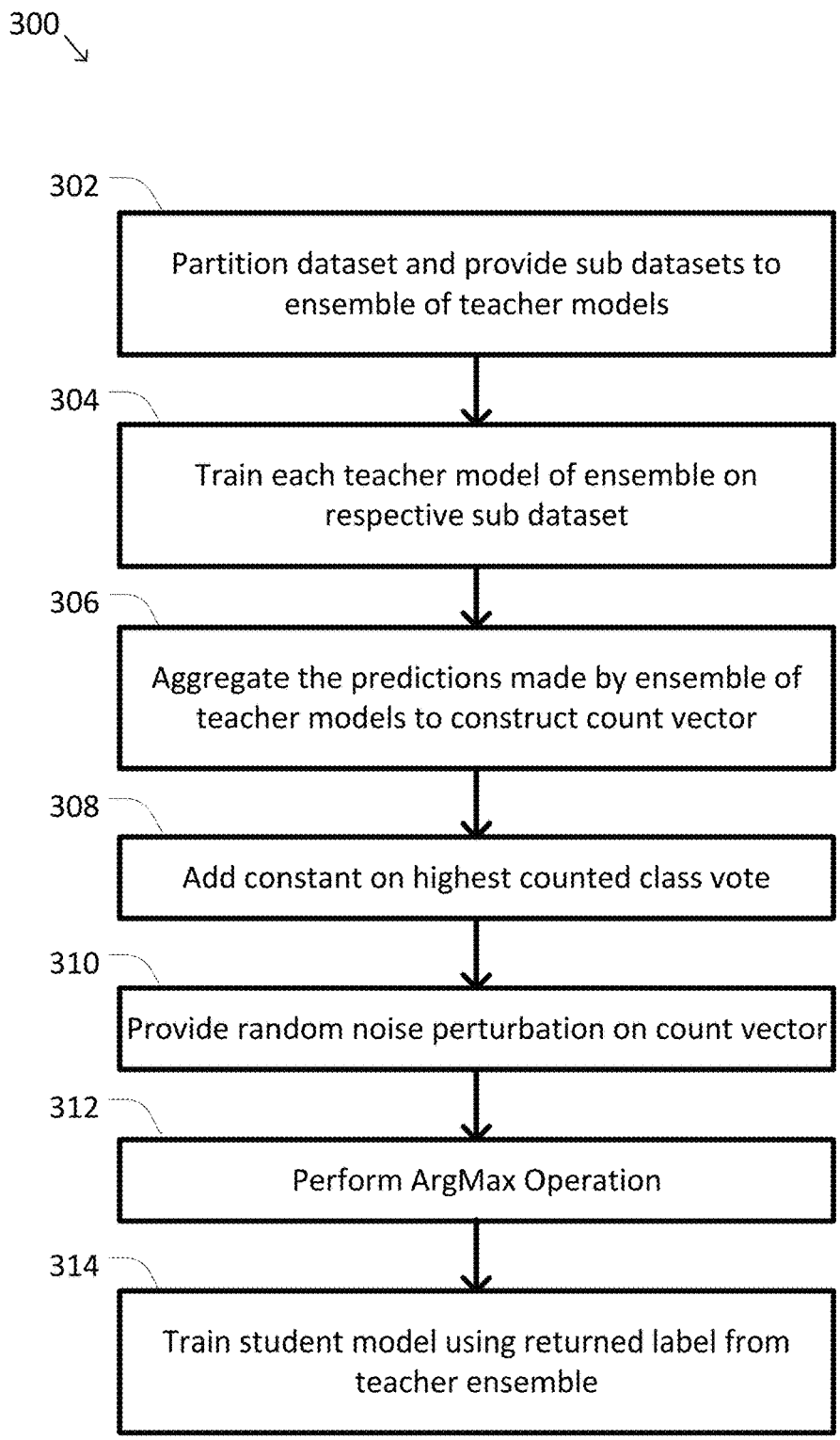
FIG. 3 is a simplified diagram of a method for near-zero-cost differentially private deep learning with teacher ensembles according to some embodiments.

FIG. 3 is a simplified diagram of a method 300 corresponding to the framework 200 according to some embodiments. One or more of the processes 302-314 of method 300 may be implemented, at least in part, in the form of executable code stored on non-transitory, tangible, machine-readable media that when run by one or more processors may cause the one or more processors to perform one or more of the processes 302-314. In some embodiments, method 300 may correspond to the method used by neural network module 130 to perform training using data including sensitive information for various tasks (e.g., diagnoses and prediction on medical diseases, image recognition, natural language processing, etc.).

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of methods 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In some embodiments, the near-zero-cost query framework 200 includes or implements the following: (1) an ensemble of n teacher models, (2) aggregation and noise perturbation, and (3) training of a student model.

Ensemble of Teachers:

Referring to FIGS. 2 and 3, a dataset D with sensitive or private information or data 202 is maintained or stored in a suitable storage 204, such as computer memory (e.g., memory 130 of FIG. 1). At a process 302, the dataset D including private data 202 is partitioned into non-overlapping sub datasets or splits 206a, 206b, 206c, 206d (e.g., Data 1, Data 2, ... Data n). Each data split 206a-d is provided to one of an ensemble 132 of n teacher models P 138a, 138b, 138c, 138d (e.g., Teacher 1, Teacher 2, ... Teacher n) for training. In other words, partition the dataset $D=\{(x_k, y_k)\}_{k=1}^{n}$ into disjointed sub datasets $\{D_i\}$ and train each teacher $P_i$ separately on each set, where i=1, ..., n, where n is the number of the datasets and n is also the number of the teachers.

At a process 304, each teacher model 138a-d of the ensemble 132 is trained on the respective data split so that it generates its own set of predictions (with associated vectors). In some examples, this training of the ensemble 132 of teacher models 138a-d is initiated or performed by a first user.

Aggregation and Noise Perturbation Mechanism:

To train the student model 136, at a process 306, the predictions made by the ensemble 132 of teacher models 138a-d are aggregated on a queried example (e.g., query x 210) from the student model 136 to construct a label count vector 208. In some embodiments, for each sample $x_k$, the estimates of the labels given by each teacher 138a-d (e.g., Teacher 1, Teacher 2, ... Teacher n) are collected, and used to construct a count vector $v(x_k) \in \mathbb{N}^L$ 208, where each entry $v_j$ is given by $v_j=|\{P_i(x_k)=j; \forall i=1, ..., n\}|$.

At a process 308, a large constant is added on the highest counted class vote of the count vector. That is, in some embodiments, for each mechanism with fixed sample x, before adding random noise, a sufficiently large constant c 212 is added, which produces or yields a new count vector $\hat{v}(x, c)$ 214. The motivation is not to protect sample x from the student model, but to protect the dataset D from the teacher. Basically, if the partition, teacher training, and query x from the student are fixed, then there is a data transformer $f$ that transfers the target dataset D into a count vector. In other words, query x 210 and constant c 212 are used to define the data transformer $f_{x,c}$ and if we query T times, then there will be T different data transformers based on each query x. Then, by using a data transformer, a count vector $\hat{v}(x, c)=f_{x,c}(D)$ can be achieved.

Note that, the following notation that $\hat{v}(x, c)$, also shortened as $\hat{v}$, is used to denote the data transformer with adding a sufficiently large constant c on the largest count, and $v(x)$ denotes the count vector 208 before adding the large constant c 212.

According to some embodiments, systems and methods of the present disclosure employ or utilize a voting mechanism. In some embodiments, the voting mechanism can be implemented as an ArgMax Mechanism, which in some examples, can be an Immutable Noisy ArgMax mechanism. The Immutable Noisy ArgMax mechanism, under certain conditions, can bear very large random noising from the teacher without affecting the useful information transferred to the student. This mechanism improves over the state-of-the-art methods in many respects, and scales to larger tasks with both higher utility and stronger privacy.

ArgMax Mechanism.

For any dataset $D=\{(x_k,y_k)\}_{k=1}^{n}$, the ArgMax Mechanism is widely used as a query function when $v(x_k) \in \mathbb{N}^d$ is a vector of counts of the dimension similar to the number of classes d for sample $x_k$. In some embodiments, this decision-making mechanism is similar to the softmax mechanism of the likelihood for each label, but instead of using the likelihood as the belief of each label, the ArgMax mechanism uses the counts given by the teacher models 138 of the ensemble 132. From the definition of the ArgMax mechanism, it is known that the result given by the ArgMax mechanism is immutable against a constant translation, i.e.:

$$\text{argmax } v(x_k) = \text{argmax } \hat{v}(x_k, c)$$

$$\hat{v}(x_k, c)_i = \begin{cases} v(x_k)_i & \text{if } i \neq \text{argmax } v(x_k) \\ v(x_k)_i + c & \text{otherwise} \end{cases}$$

where subscript i is used to index through the vector.

Noisy ArgMax Mechanism.

It is desired that the outputs of the given well-trained teacher models 138a-d of the ensemble 132 are differentially private. In some examples, a simple algorithm is to add independently generated random noise (e.g., independent Laplacian, Gaussian noise, etc.) to each count and return the index of the largest noisy count. This noisy ArgMax mechanism is $(\varepsilon, 0)$-differentially private for the query given by the ArgMax mechanism. Further details for the Noisy ArgMax Mechanism are provided in Dwork et al., "The algorithmic foundations of differential privacy," *Foundations and Trends in Theoretical Computer Science*, 9:211-407 (2014), which is incorporated by reference herein.

Immutable Noisy ArgMax Mechanism.

It is observed from the Noisy ArgMax mechanism that when the aggregated results from the teacher models 138a-d (e.g., Teacher 1, Teacher 2, ... Teacher n) are very concentrated (i.e., most of the predictions agree on a certain class) and of high counts (i.e., large number of teachers), the result from the ArgMax will not change even under relatively large random noise. This can happen in practice, if all the teacher models 138a-d have relatively good performance on that task. This observation also indicates that if the largest count is made much larger than the rest of the counts, immutability can be achieved even with significant noise.

Define the data transformer as a function that could convert a dataset into a count vector as below:

Definition 3

(Data Transformer). Given any dataset D, the output of data transformer $f$ is an integer-based vector, such as $f(D) \in \mathbb{Z}^{|r|}$, where r is the dimension of the vector.

Definition 4

(Distance-n Data Transformer). Given a dataset D and data transformer function $f$, the distance n means the difference between the first and second largest counts given by the $f(D)$ is larger than n.

Then, the theorem for immutable noisy ArgMax is as follows,

Lemma 1.

[Noisy ArgMax Immutability] Given any dataset D, fixed noise perturbation vector and a transformer function $f$, the noisy argmax of both $f(D)$ is immutable while adding a sufficiently large constant c into the current largest count of $f(D)$.

Theorem 3.

[Differential private with Noisy ArgMax Immutability] Given any dataset D, its adjacent dataset D', fixed noise perturbation vector and a transformer function $f$, while $\Delta f=1$ or ($\Delta_2 f=1$) and the distance of $f(D)$ is larger than 2, the noisy argmax of both $f(D)$ and $f(D')$ is immutable and the same while adding a sufficiently large constant c into the current largest count.

In essence, when fed with a neighboring dataset D', if the counts of $f(D)$ is different by n, the output of the ArgMax mechanism remains unchanged. This immutability to the noise or difference in counts due to the neighboring datasets, makes the output of the teacher ensemble 132 unchanged, and thus maintains the advantage of higher performance in accuracy using the teacher ensembles.

Thus, referring again to FIGS. 2 and 3, at a process 310, the count vector 208 is randomly perturbed with noise 216, and at a process 312, an ArgMax operation is performed. In some embodiments, this can be an immutable noisy argmax operation. In some embodiments, Laplacian random noise is added to the voting counts $\hat{v}(x, c)$ to introduce ambiguity:

$$\mathcal{M}(x) \triangleq \mathrm{argmax}\left\{\hat{v}(x, c) + \mathrm{Lap}\left(\frac{\Delta f}{\gamma}\right)\right\},$$

where, $\gamma$ is a privacy parameter and Lap(b) the Laplacian distribution with location 0 and scale b. The parameter $\gamma$ influences the privacy guarantee, which is analyzed later herein.

Gaussian random noise is another choice for perturbing $\hat{v}(x, c)$ to introduce ambiguity:

$$\mathcal{M}(x) \triangleq \mathrm{arg\,max}\{\hat{v}(x,c) + \mathcal{N}(0, \Delta_2 f^2 \sigma^2)\},$$

where $\mathcal{N}(0, \sigma^2)$ is the Gaussian distribution with mean 0 and variance $\sigma^2$.

Intuitively, a small $\gamma$ and large $\sigma$ lead to a strong privacy guarantee, but can degrade the accuracy of the pre-trained teacher model and the size of each label in the dataset, as the noisy maximum f above can differ from the true plurality.

Unlike the original noisy argmax mechanism, the immutable noisy argmax mechanism of the present disclosure will not increase privacy cost when increasing the number of queries, if a sufficiently large constant c and a large random noise are chosen by setting a very small $\gamma$ for Laplacian mechanism (or a large $\sigma$ for Gaussian mechanism). Therefore, for each query x 210, it would cost almost zero privacy budget. By utilizing the property of immutable noisy argmax, the systems and methods of the present disclosure can allow a large number of queries x with near zero privacy budget (setting c→+∞ and a large random noise for the mechanism).

Student Model:

The final step is to use the returned information from the teacher to train a student model. Thus, referring again to FIGS. 2 and 3, at a process 314, the student model 136 is trained by using the returned label from the teacher ensemble 132. In some examples, the training of the student models 136 is initiated or performed by a second user. In previous works, due to the limited privacy budget, one only can query very few samples x and optionally use semi-supervised learning to learn a better student model. The approach of the present disclosure enables using a large number of queries x from the student 136 with near zero cost privacy budget overall Like training a teacher model 138, here, the student model 136 also could be trained with any of a variety of learning techniques.

Privacy Analysis

The differential privacy guarantees of the near-zero-cost query framework (including privacy counting approach) described herein are analyzed. Namely, the privacy budget is tracked throughout the student's training using the moments accountant (as described in Abadi et al., "Deep learning with differential privacy," *In Proceedings of the* 2016 *ACM SIGSAC Conference on Computer and Communications Security*, CCS '16, pages 308-318, (2016)). When teachers reach a strong quorum, this allows privacy costs to be bound more strictly.

Moments Accountant.

To better keep track of the privacy cost, recent advances in privacy cost accounting—such as the moments accountant—can be used.

Definition 5.

Let $\mathcal{M} : D \rightarrow \mathbb{R}$ be a randomized mechanism and D, D' a pair of adjacent databases. Let aux denote an auxiliary input. The moments accountant is defined as:

$$\alpha_{\mathcal{M}}(\lambda) = \max_{aux, d, d'} \alpha_{\mathcal{M}}(\lambda; aux, D, D').$$

where $\alpha_{\mathcal{M}}(\lambda; aux, D, D') = \log \mathbb{E}[\exp(\lambda C(\mathcal{M}, aux, D, D'))]$ is the moment generating function of the privacy loss random variable.

The moments accountant has properties of composability and tail bound:

[Composability].

Suppose that a mechanism $\mathcal{M}$ consists of a sequence of adaptive mechanisms $\mathcal{M}_1, \ldots, \mathcal{M}_k$, where $\mathcal{M}_i : \Pi_{j=1}^{i-1} \mathcal{R}_j \times D \rightarrow \mathcal{R}_i$. Then, for any output sequence $o_1, \ldots, o_{k-1}$ and any $\lambda$ $$\alpha_{\mathcal{M}}(\lambda; D, D') \leq \sum_{i=1}^{k} \alpha_{\mathcal{M}_i}(\lambda; o_1, \ldots, o_{i-1}, D, D').$$

where $\alpha_{\mathcal{M}}$ is conditioned on $\mathcal{M}_i$'s output being $o_i$ for i<k.

[Tail Bound]

For any $\epsilon > 0$, the mechanism $\mathcal{M}$ is ($\epsilon$, $\delta$)-differential privacy for $$\delta = \min_{\lambda} \exp(\alpha_{\mathcal{M}}(\lambda) - \lambda \epsilon).$$

By using the above two properties, the moments of randomized mechanism can be bound based on each sub-mechanism, and then convert the moments accountant to ($\epsilon$, $\delta$)-differential privacy based on the tail bound.

Analysis of Approach or Framework.

Theorem 4

(Laplacian Mechanism with Teacher Ensembles). Suppose that on neighboring databases D, D', the voting counts v(x, c) differ by at most $\Delta f$ in each coordinate. Let $\mathcal{M}_{x,c}$ be the mechanism that reports $\arg\max_j v(x, c) + \mathrm{Lap}(\Delta f/\gamma)$. Then $\mathcal{M}_{x,c}$ satisfies (2$\gamma$, 0)-differential privacy. Moreover, for any l, aux, D and D', $$\alpha(l; aux, \mathcal{D}, \mathcal{D}') \leq 2\gamma^2 l(l+1) \quad (5)$$

For each query x, use the aggregation mechanism with noise $\mathrm{Lap}(\Delta f/\gamma)$ which is (2$\gamma$, 0)-DP. Thus, over T queries, we get $$\left(4T\gamma^2 + 2\gamma\sqrt{2T \ln\frac{1}{\delta}}, \delta\right)\text{-differential privacy.}$$

In the approach or framework of the present disclosure, a very small $\gamma$ can be chosen for each mechanism with each query x, which leads to very small privacy cost for each query and thus a low privacy budget. Overall, the approach or framework costs near zero privacy budget while $\gamma \rightarrow 0$. Note that, $\gamma$ is a very small number but is not exactly zero; $\gamma$ can be set to be very small that would result in a very large noise scale but still smaller than the constant c that is added in $\hat{v}$. Note that, for neighboring databases D, D', each teacher gets the same training data partition (that is, the same for the teacher with D and with D', not the same across teachers), with the exception of one teacher whose corresponding training data partition differs.

The Gaussian mechanism is based on Renyi differential privacy (as discussed in further detail in Papernot et al., "Scalable private learning with pate," In 6th International Conference on Learning Representations, ICLR '18, (2018), incorporated by reference herein). Similar to the Laplacian mechanism, using the Gaussian mechanism in the approach of the present disclosure yields near zero cost privacy budget overall due to setting a large a and an even larger constant c.

The following shows the relation between constant c with $\gamma$ and c with $\sigma$ in two mechanisms while $\Delta f=1$ (or $\Delta_2 f=1$). First, recall the following basic facts about the Laplacian and Gaussian distributions: if $\zeta \sim \text{Lap}(1/\gamma)$ and $\xi \sim \mathcal{N}(0, \sigma^2)$, then for c>0, $$Pr(|\zeta| \geq c) = e^{-\gamma c}$$

and $$Pr(|\xi| \geq c) \leq 2e^{\frac{-c^2}{2c^2}}.$$

Now if each $|\zeta_j|<c$ (resp. $|\xi_j|<c$) for j=1, . . . , L, then the argmax will not change. A simple union bound can be applied to get an upper bound on the probability of these events.

$$Pr\left(\max_{j=1,\ldots,L}|\zeta_j| \geq c\right) \leq Le^{-\gamma c}$$

and $$Pr\left(\max_{j=1,\ldots,L}|\xi_j| \geq c\right) \leq 2Le^{\frac{-c^2}{2c^2}}.$$

Thus, to obtain a failure probability at most $\tau$, in the Laplacian case we can take $$c = \frac{1}{\gamma}\log(L/\tau),$$

and in the Gaussian case we can take $c=\sqrt{2\sigma^2\log(2L/\tau)}$.

Results

Results on the systems and methods employing or implementing the near-zero-cost (NZC) query framework or approach are presented, and may be compared against other methods or approaches for privacy, for example, LNMax (as described in Papernot et al., "Semi-supervised knowledge transfer for deep learning from private training data," In 5th International Conference on Learning Representations, ICLR '17 (2017)), as seen in the tables of FIGS. 4A and 4B.

In some examples, experiments were performed on two widely used datasets on differential privacy: SVHN and MNIST. MNIST and SVHN are two well-known digital image datasets consisting of 60K and 73K training samples, respectively. The experiments use the same data partition method and train the 250 teacher models as in Papernot et al. (2017). In particular, for MNIST, 10,000 samples are used as the student dataset, which is split into 9,000 samples and 1,000 samples as training set and testing set, respectively, for experiments. For SVHN, 26,032 samples are used as the student dataset, which is split into 10,000 samples and 16,032 samples as training set and testing set, respectively. For both MNIST and SVHN, the teacher uses the same network structure as in Papernot et al. (2017).

The table of FIG. 4A shows results for classification accuracy and privacy of the students on both MNIST and SVHN datasets, for the various approaches LNMax and NZC. The number of teachers is set to 250 unless otherwise mentioned. We set $\delta=10^{-5}$ to compute values of E (with the exception of SVHN where $\delta=10^{-6}$). The baselines refer to students that are trained from the noiseless votes from all teachers. Ground truth refers to students that are trained with ground truth query labels.

The table of FIG. 4B shows results for label accuracy of teacher ensembles when compared to the ground truth labels from various approaches (including LNMax and NZC) using 250 teachers. "Clean" denotes the aggregation without adding any noise perturbation.

It is clear that the near-zero-cost (NZC) query framework or approach of the present disclosure achieves both better accuracy and better privacy cost as compared to the LNMax approach. In particular, the results are very close to the baseline results, where the student is trained by using the non-perturbed votes from the teacher ensembles. One reason is that NZC is more robust against the random perturbations for most of the queries, which helps the student to obtain better quality labels for training. NZC also achieves strong privacy cost, because it allows using very large noise scale, as long as the constant c is set to a proper large value. For confirmation, the number of correctly labeled queries from the teacher ensembles was calculated, and the results shown in the tables of FIGS. 4A and 4B. The NZC approach is more robust against noise perturbation as compared to the previous LNMax approach.

In some examples, the number of teachers in the ensemble may have an impact on the performance of the student, as the teachers are trained on non-overlapping splits of the data. The greater the number of teachers, the less data any given teacher has for training. This leads to less accurate individual teachers, and thus less likely to have correct vote for the query. In some examples, the performance of the teacher ensemble may decrease as the number of teachers increases. This is more prominent for more challenging datasets (e.g., SVHN performance drops more significantly as compared to MNIST). Although the number of qualified samples increases as the number of teachers increase, it is at the cost of increasing the wrongly labeled queries, since the total accuracy of teachers has decreased. Because of this, it can result in worse student performance. However, the previous approach such as PATE (Papernot et al., 2017) or Scale PATE (Papernot et al., 2018) requires large number of teachers due to privacy budget constraints. The NZC approach does not have this limitation. The results from using less teachers improved significantly, and approaches closer to the performance when the training student with the ground truth.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for private deep learning, comprising:
    a communication interface that receives model is used to process input data including sensitive information;
    a memory storing a machine learning model and a plurality of processor-executable instructions; and
    one or more processors that execute the plurality of processor-executable instructions,
    wherein during a training process of the machine learning model, to:
        partition a dataset including the sensitive information into a plurality of data splits;
        train each of a plurality of teacher models in an ensemble with a respective one of the data splits;
        in response to a query, generate, by each trained teacher model, a respective prediction;
        aggregate the predictions generated by the teacher models in the ensemble into a label count vector by computing each entry in the label count vector based on a sum of predicted probabilities from the plurality of teacher models corresponding to a respective label;
        perturb the label count vector for the teacher ensemble with noise and by adding a constant to a highest counted class vote in the label count vector; and
        train a student model using the perturbed label count vector for the teacher ensemble.

2. The system of claim 1, wherein aggregating the predictions is responsive to a query from the student model.

3. The system of claim 1, wherein the noise used to perturb the label count vector is random.

4. The system of claim 1, wherein the machine learning model is configured to use a query function.

5. The system of claim 1, wherein during a training process, the machine learning model performs a noisy ArgMax operation on the label count vector for the teacher ensemble.

6. The system of claim 1, wherein during a training process, the machine learning model performs an immutable noisy ArgMax operation on the label count vector for the teacher ensemble.

7. A method for training a machine learning model with private deep learning, comprising:
    partitioning a dataset including the sensitive information into a plurality of data splits;
    training each of a plurality of teacher models in an ensemble with a respective one of the data splits;
    in response to a query, generating, by each trained teacher model, a respective prediction;
    aggregating the predictions generated by the teacher models in the ensemble into a label count vector by computing each entry in the label count vector based on a sum of predicted probabilities from the plurality of teacher models corresponding to a respective label;
    perturbing the label count vector for the teacher ensemble with noise and by adding a constant to a highest counted class vote in the label count vector; and
    training a student model using the perturbed label count vector for the teacher ensemble.

8. The method of claim 7, wherein aggregating the predictions is responsive to a query from the student model.

9. The method of claim 7, wherein the noise used to perturb the label count vector is random.

10. The method of claim 7, comprising the student model making a query function to the label count vector.

11. The method of claim 7, comprising performing a noisy ArgMax operation on the label count vector for the teacher ensemble.

12. The method of claim 7, comprising performing an immutable noisy ArgMax operation on the label count vector for the teacher ensemble.

13. A non-transitory machine-readable medium comprising a plurality of machine-readable instructions which, when executed by one or more processors, are adapted to cause the one or more processors to perform a method for training a machine learning model with private deep learning comprising:
    partitioning a dataset including the sensitive information into a plurality of data splits;
    training each of a plurality of teacher models in an ensemble with a respective one of the data splits;
    in response to a query, generating, by each trained teacher model, a respective prediction;
    aggregating the predictions generated by the teacher models in the ensemble into a label count vector by computing each entry in the label count vector based on a sum of predicted probabilities from the plurality of teacher models corresponding to a respective label;
    perturbing the label count vector for the teacher ensemble with noise and by adding a constant to a highest counted class vote in the label count vector; and
    training a student model using the perturbed label count vector for the teacher ensemble.

14. The non-transitory machine-readable medium of claim 13, wherein aggregating the predictions is responsive to a query from the student model.

15. The non-transitory machine-readable medium of claim 13, wherein the noise used to perturb the label count vector is random.

16. The non-transitory machine-readable medium of claim 13, comprising the student model making a query function to the label count vector.

17. The non-transitory machine-readable medium of claim 13, comprising performing a noisy ArgMax operation on the label count vector for the teacher ensemble.

18. The non-transitory machine-readable medium of claim 13, comprising performing an immutable noisy ArgMax operation on the label count vector for the teacher ensemble.

\* \* \* \* \*